(12) United States Patent
Robel et al.

(10) Patent No.: US 7,552,583 B2
(45) Date of Patent: Jun. 30, 2009

(54) EXHAUST PURIFICATION WITH ON-BOARD AMMONIA PRODUCTION

(75) Inventors: Wade J. Robel, Peoria, IL (US); James J. Driscoll, Dunlap, IL (US); Gerald N. Coleman, Peterborough (GB); Kevin J. Knox, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 10/982,921

(22) Filed: Nov. 8, 2004

(65) Prior Publication Data

US 2006/0096275 A1 May 11, 2006

(51) Int. Cl.
*F01N 3/00* (2006.01)
(52) U.S. Cl. .............................. 60/286; 60/274; 60/208; 60/295; 60/301
(58) Field of Classification Search .................... 60/274, 60/280, 285, 286, 289, 295, 303, 301; 123/198 F, 123/443
See application file for complete search history.

(56) References Cited

U.S. PATENT DOCUMENTS

| | | | |
|---|---|---|---|
| 5,657,625 A * | 8/1997 | Koga et al. ..................... 60/274 |
| 5,714,130 A | 2/1998 | Saito et al. |
| 5,746,052 A | 5/1998 | Kinugasa et al. |
| 5,964,088 A | 10/1999 | Kinugasa et al. |
| 6,023,929 A * | 2/2000 | Ma ............................... 60/295 |
| 6,047,542 A | 4/2000 | Kinugasa et al. |
| 6,109,024 A | 8/2000 | Kinugasa et al. |
| 6,119,452 A | 9/2000 | Kinugasa et al. |
| 6,122,910 A | 9/2000 | Hoshi et al. |
| 6,128,898 A | 10/2000 | Sakurai et al. |
| 6,133,185 A | 10/2000 | Kinugasa et al. |
| 6,151,890 A * | 11/2000 | Hoshi .......................... 60/297 |
| 6,176,079 B1 | 1/2001 | Konrad et al. |
| 6,289,672 B1 | 9/2001 | Katoh et al. |
| 6,334,986 B2 | 1/2002 | Gieshoff et al. |
| 6,338,244 B1 | 1/2002 | Guenther et al. |
| 6,345,496 B1 | 2/2002 | Fuwa et al. |
| 6,408,618 B2 * | 6/2002 | Ide ............................... 60/285 |
| 6,662,552 B1 | 12/2003 | Gunther et al. |
| 6,732,507 B1 | 5/2004 | Stanglmaier |
| 6,739,125 B1 | 5/2004 | Mulligan |
| 6,951,098 B2 * | 10/2005 | Xu et al. ........................ 60/286 |
| 2004/0076565 A1 | 4/2004 | Gandhi et al. |
| 2005/0034701 A1 * | 2/2005 | Betz et al. ................. 123/198 F |

FOREIGN PATENT DOCUMENTS

JP 09004441 A * 1/1997 .................. 60/286

* cited by examiner

*Primary Examiner*—Binh Q. Tran
(74) *Attorney, Agent, or Firm*—Finnegan, Henderson, Farabow, Garrett & Dunner

(57) ABSTRACT

A power source is provided for use with selective catalytic reduction systems for exhaust-gas purification. The power source includes a first cylinder group with a first air-intake passage and a first exhaust passage, and a second cylinder group with a second air-intake passage and a second exhaust passage. The second air-intake passage is fluidly isolated from the first air-intake passage. A fuel-supply device may be configured to supply fuel into the first exhaust passage, and a catalyst may be disposed downstream of the fuel-supply device to convert at least a portion of the exhaust stream in the first exhaust passage into ammonia.

36 Claims, 4 Drawing Sheets

|  | CYLINDER 42 | CYLINDER 44 | CYLINDER 38 | CYLINDER 40 | CYLINDER 46 | CYLINDER 48 |
| --- | --- | --- | --- | --- | --- | --- |
| RELATIVE POWER OUTPUT TIME 1: | 1.0x | 1.0x | 1.0x | 1.0x | 1.0x | 1.0x |
| RELATIVE POWER OUTPUT TIME 2: | 1.25x | 1.25x | 0.25x | 0.75x | 1.25x | 1.25x |
| RELATIVE POWER OUTPUT TIME 3: | 1.2x | 1.2x | 0.25x | 0.95x | 1.2x | 1.2x |

*FIG. 4*

EXHAUST PURIFICATION WITH ON-BOARD AMMONIA PRODUCTION

U.S. GOVERNMENT RIGHTS

This invention was made with government support under the terms of Contract No. DE-FC05-00OR22806 awarded by the Department of Energy. The government may have certain rights in this invention.

TECHNICAL FIELD

This disclosure pertains generally to exhaust-gas purification systems for engines, and more particularly, to selective catalytic reduction systems with on-board ammonia production.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between exhaust-gas ammonia and NOx to produce water and nitrogen gas, thereby removing NOx from the exhaust gas.

The ammonia that is used for the SCR system may be produced during the operation of the NOx-producing system or may be stored for injection when needed. Because of the high reactivity of ammonia, storage of ammonia can be hazardous. Further, on-board production of ammonia can be costly and may require specialized equipment.

One method of on-board ammonia production for an engine is disclosed in U.S. Pat. No. 6,047,542, issued to Kinugasa on Apr. 11, 2000 (hereinafter the '542 patent). The method includes the use of multiple cylinder groups for purifying exhaust gas. In the method of the '542 patent, the exhaust gas of one cylinder group may be made rich by controlling the amount of fuel injected into the cylinder group. The rich exhaust gas of this cylinder group may then be passed over an ammonia-synthesizing catalyst to convert a portion of the NOx in the exhaust gas into ammonia. The exhaust gas and ammonia of the first cylinder group are then combined with the exhaust gas of a second cylinder group and passed through an SCR catalyst where the ammonia reacts with NOx to produce nitrogen gas and water.

While the method of the '542 patent may reduce NOx from an exhaust stream through use of on-board ammonia production, the method of the '542 patent has several drawbacks. For example, an engine may function less efficiently and with lower power output when rich combustion occurs in one cylinder group. Furthermore, using the method of the '542 patent, it may be more difficult to provide adequate and controlled air intake to both cylinder groups, and the two cylinder groups, operating as described in the '542 patent, may cause significant engine vibration.

The present disclosure is directed at overcoming one or more of the problems or disadvantages in the prior art.

SUMMARY OF THE INVENTION

One aspect of the present disclosure includes a power source for use with selective catalytic reduction systems for exhaust-gas purification. The power source includes a first cylinder group with a first air-intake passage and a first exhaust passage. The power source also includes a second cylinder group with a second air-intake passage and a second exhaust passage. The second air-intake passage may be fluidly isolated from the first air-intake passage, and a fuel-supply device may be configured to supply fuel into the first exhaust passage. A catalyst may be disposed downstream of the fuel-supply device to convert at least a portion of the exhaust stream in the first exhaust passage into ammonia.

A second aspect of the present disclosure includes a power source for use with selective catalytic reduction systems for exhaust-gas purification. The power source may include a first cylinder group including one or more cylinders, a first air-intake passage in fluid communication with the one or more cylinders of the first cylinder group, and a first exhaust passage in fluid communication with the one or more cylinders of the first cylinder group. The power source may also include a second cylinder group including at least two cylinders, wherein a single cylinder of the second cylinder group and a single cylinder of the first cylinder group have a matched stroke cycle, and all other cylinders from the second cylinder group have unique stroke cycles. A second air-intake passage may be in fluid communication with the at least two cylinders of the second cylinder group, wherein the second air-intake passage is fluidly isolated from the first air-intake passage, and a second exhaust passage may be in fluid communication with the at least two cylinders of the second cylinder group. A fuel-supply device may be configured to supply fuel into the first exhaust passage, and a catalyst may be disposed downstream of the fuel-supply device to convert at least a portion of the exhaust in the first exhaust passage into ammonia.

A third aspect of the present disclosure includes a method of operating a power source for use with selective catalytic reduction systems for exhaust-gas purification. The method may include supplying air through a first air-intake passage to a first cylinder group including one or more cylinders, and supplying a first exhaust stream to a first exhaust passage in fluid communication with the one or more cylinders of the first cylinder group. Air may be supplied through a second air-intake passage to a second cylinder group including at least two cylinders. The second air-intake passage may be fluidly isolated from the first air-intake passage. A second exhaust stream may be supplied to a second exhaust passage in fluid communication with the at least two cylinders of the second cylinder group. Fuel may be supplied to the first exhaust stream from a fuel-supply device operably connected to the first exhaust passage, and at least a portion of the first exhaust stream may be converted to ammonia.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system. In the drawings:

FIG. 4 provides a chart of relative power outputs of multiple cylinders, as shown in FIG. 2, at three distinct times according to an exemplary embodiment.

DETAILED DESCRIPTION

Figure 1:
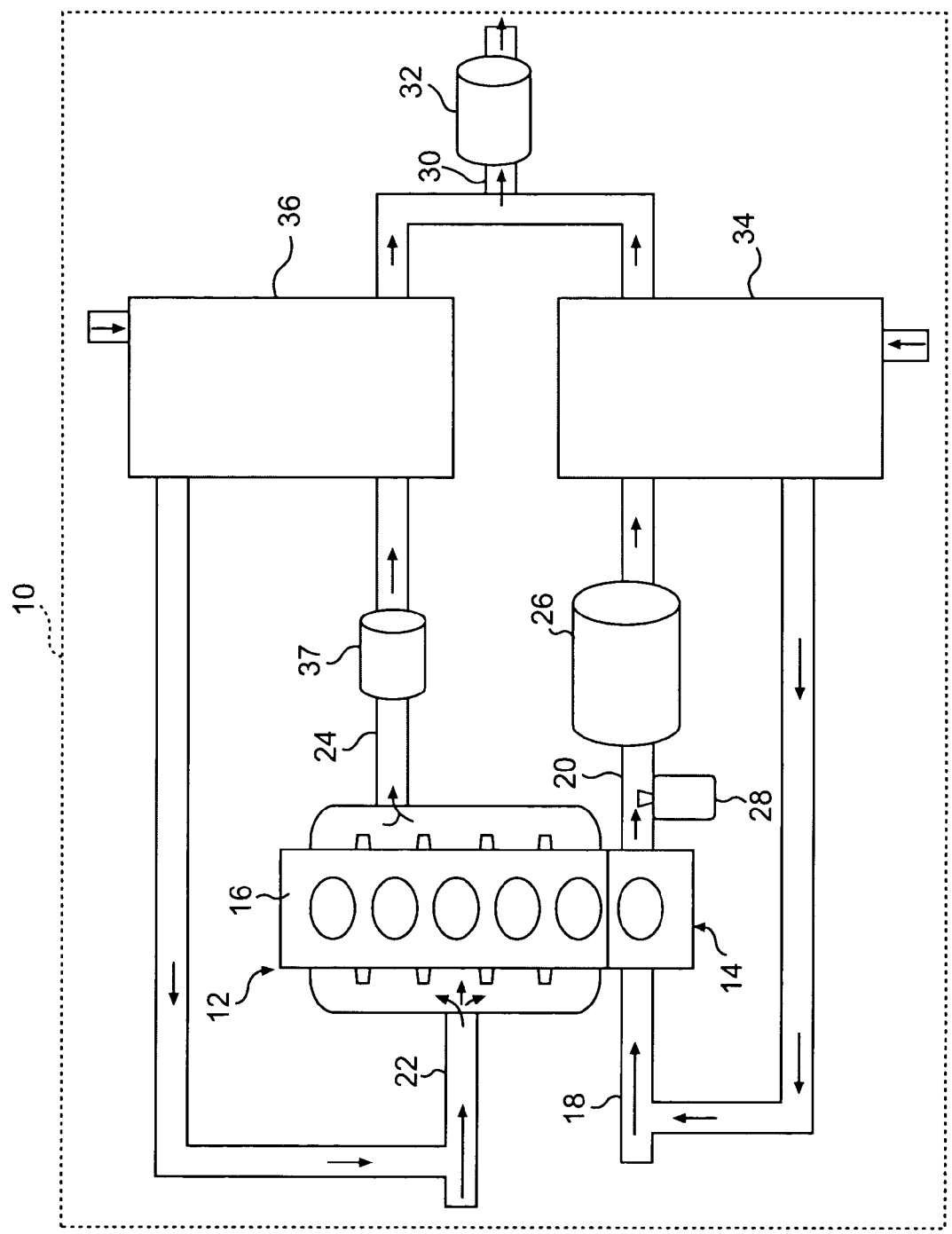
FIG. 1 provides a schematic diagram of a power source according to an exemplary disclosed embodiment.

FIG. 1 provides a schematic representation of a work machine 10 of the present disclosure including a power source 12. Power source 12 may include a first cylinder group 14 and a second cylinder group 16. First cylinder group 14 may fluidly communicate with a first air-intake passage 18 and a first exhaust passage 20. Second cylinder group 16 may fluidly communicate with a second air-intake passage 22 and a second exhaust passage 24. In one embodiment, first air-intake passage 18 is fluidly isolated from second air-intake passage 22.

The operation of engine cylinders may be dependant on the ratio of air to fuel-vapor that is injected into the cylinders during operation. The air to fuel-vapor ratio is often expressed as a lambda value, which is derived from the stoichiometric air to fuel-vapor ratio. The stoichiometric air to fuel-vapor ratio is the chemically correct ratio for combustion to take place. A stoichiometric air to fuel-vapor ratio may be considered to be equivalent to a lambda value of 1.0.

Engine cylinders may operate at non-stoichiometric air to fuel-vapor ratios. An engine cylinder with a lower air to fuel-vapor ratio has a lambda less than 1.0 and is said to be rich. An engine cylinder with a higher air to fuel-vapor ratio has a lambda greater than 1.0 and is said to be lean.

Lambda may affect cylinder NOx emissions and fuel efficiency. A lean-operating cylinder may have improved fuel efficiency compared to a cylinder operating under stoichiometric or rich conditions. However, lean operation may increase NOx production or may make elimination of NOx in the exhaust gas difficult.

SCR systems provide a method for decreasing exhaust-gas NOx emissions through the use of ammonia. In an exemplary embodiment of the present disclosure, engine NOx generated by lean combustion in first cylinder group 14 may be converted into ammonia. This ammonia may be used with an SCR system to remove NOx produced as a byproduct of fuel combustion in power source 12.

In one embodiment, power source 12 of the present disclosure may include an ammonia-producing catalyst 26 that may be configured to convert at least a portion of the exhaust-gas stream from first cylinder group 14 into ammonia. This ammonia may be produced by a reaction between NOx and other substances in the exhaust-gas stream from first cylinder group 14. For example, NOx may react with a variety of other combustion byproducts to produce ammonia. These other combustion byproducts may include, for example, $H_2$ (hydrogen gas), $C_3H_6$ (propene), or CO (carbon monoxide).

Ammonia-producing catalyst 26 may be made from a variety of materials. In one embodiment, ammonia-producing catalyst 26 may include at least one of platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards.

Lean operation of first cylinder group 14 may allow increased NOx production as compared to stoichiometric or rich operation of first cylinder group 14. Further, the efficiency of conversion of NOx to ammonia by ammonia-producing catalyst 26 may be improved under rich conditions. Therefore, to increase ammonia production, engine cylinders may be operated under lean conditions in order to produce a NOx-containing exhaust gas, and fuel may be supplied to this NOx-containing exhaust gas to produce a rich, NOx-containing exhaust gas that can be used to produce ammonia by ammonia-producing catalyst 26.

First cylinder group 14 may include one or more cylinders, and second cylinder group 16 may include at least two cylinders. For example, first cylinder group 14 may include between one and ten cylinders, and second cylinder group 16 may include between two and twelve cylinders. In one embodiment, first cylinder group 14 may include only one cylinder, and second cylinder group 16 may include five cylinders. In another embodiment, first cylinder group 14 may include one cylinder, and second cylinder group 16 may include seven cylinders. In another embodiment, first cylinder group 14 may include one cylinder, and second cylinder group 16 may include eleven cylinders. The number of cylinders in first cylinder group 14 and the number of cylinders in second cylinder group 16 may be selected based on a desired power output to be produced by power source 12.

In one embodiment, first cylinder group 14 may operate with a lean air-to-fuel ratio within the one or more cylinders of first cylinder group 14. The one or more cylinders of first cylinder group 14, operating with a lean air to fuel-vapor ratio, may produce a lean exhaust-gas stream that contains NOx. The lean, NOx-containing exhaust-gas stream may flow into first exhaust passage 20, which may be fluidly connected with the one or more cylinders of first cylinder group 14.

In order to produce the rich conditions that favor conversion of NOx to ammonia, a fuel-supply device 28 may be configured to supply fuel into first exhaust passage 20. In one embodiment, a lean, NOx-containing exhaust-gas stream may be delivered to first exhaust passage 20, and fuel-supply device 28 may be configured to supply fuel into first exhaust passage 20, thereby making the exhaust-gas stream rich. In one embodiment, the exhaust-gas stream in first exhaust passage 20 may be lean upstream of fuel-supply device 28 and rich downstream of fuel-supply device 28.

First exhaust passage 20 may fluidly communicate with second exhaust passage 24 at a point downstream of fuel-supply device 28 to form a merged exhaust passage 30. Merged exhaust passage 30 may contain a mixture of an exhaust-gas stream produced by second cylinder group 16 and an ammonia-containing, exhaust-gas stream produced by ammonia-producing catalyst 26 in first exhaust passage 20.

A NOx-reducing catalyst 32 may be disposed in merged exhaust passage 30. In one embodiment, NOx-reducing catalyst 32 may facilitate a reaction between ammonia and NOx to at least partially remove NOx from the exhaust-gas stream in merged exhaust passage 30. For example, NOx-reducing catalyst 32 may facilitate a reaction between ammonia and NOx to produce nitrogen gas and water, among other reaction products.

Power source 12 may include forced-induction systems to increase power output and/or control the air to fuel-vapor ratios within the cylinders of first cylinder group 14 or second cylinder group 16. Forced-induction systems may include, for example, turbochargers and/or superchargers. In one embodiment, a first forced-induction system 34 may be operably connected with first air-intake passage 18, and a second forced-induction system 36 may be operably connected with second air-intake passage 22.

In one embodiment, first forced-induction system 34 or second forced-induction system 36 may be a turbocharger. The turbocharger may utilize the exhaust gas in first exhaust passage 20 or second exhaust passage 24 to generate power for a compressor, and this compressor may provide additional air to first air-intake passage 18 or second air-intake passage 22. Therefore, if first forced-induction system 34 or second forced-induction system 36 is a turbocharger, the turbocharger may be operably connected with both an exhaust passage 20, 24 and an air-intake passage 18, 22, as shown in FIG. 1.

In one embodiment, first forced-induction system 34 may be a turbocharger, and ammonia-producing catalyst 26 may be positioned downstream of first forced induction system 34. The exhaust stream in first exhaust passage 20 may be cooler downstream of first forced-induction system 34 than upstream of first forced-induction system 34. Ammonia-producing catalyst 26 may function more efficiently when exposed to a cooler exhaust-gas downstream of first forced-induction system 34.

In one embodiment, first forced-induction system 34 or second forced-induction system 36 may be a supercharger. A supercharger may derive its power from a belt that connects directly to an engine. Further, superchargers do not need to be connected with an exhaust stream. Therefore, if first forced-induction system 34 or second forced-induction system 36 is a supercharger, the supercharger may be operably connected with first air-intake passage 18 or second air-intake passage 22, but the supercharger will not be operably connected with first exhaust passage 20 or second exhaust passage 24.

In an alternative embodiment, first air-intake passage 18 or second air-intake passage 22 may be naturally aspirated. A naturally aspirated air-intake passage may include no forced-induction system. Alternatively, an air-intake passage may include a forced-induction system, but the forced-induction system may be turned on and off based on demand. For example, when increased airflow is needed, first forced-induction system 34 or second forced-induction system 36 may be turned on to supply additional air to first air-intake passage 18 and/or second air-intake passage 22. When lower air-intake is needed, such as when little power is needed from power source 12, first air-intake passage 18 and/or second air intake passage 22 may be naturally aspirated. In one embodiment, second air-intake passage 22 may be operably connected with second forced-induction system 36, and first air-intake passage 18 may be naturally aspirated.

In one embodiment, second exhaust passage 24 may include an oxidation catalyst 37. NOx may include several oxides of nitrogen including nitric oxide (NO) and nitrogen dioxide ($NO_2$), and NOx-reducing catalyst 34 may function most effectively with a ratio of $NO:NO_2$ of about 1:1. Oxidation catalyst 37 may be configured to control a ratio of $NO:NO_2$ in second exhaust passage 24. Further, by controlling a ratio of $NO:NO_2$ in second exhaust passage 24, oxidation catalyst 37 may also be configured to control a ratio of $NO:NO_2$ in merged exhaust passage 30.

A variety of additional catalysts and/or filters may be included in first-exhaust passage 20 and/or second-exhaust passage 24. These catalysts and filters may include particulate filters, NOx traps, and/or three-way catalysts. In one embodiment, first-exhaust passage 20 and/or second-exhaust passage 24 may include, for example, one or more diesel particulate filters.

In one embodiment of the present disclosure, the power outputs of the one or more cylinders of first cylinder group 14 may be different than the power outputs of the cylinders of second cylinder group 16. To avoid potential vibration that may result from unbalanced cylinder operation, the stroke cycles of one or more cylinders of first cylinder group 14 may be matched with the stoke cycles of one or more cylinders of second cylinder group 16.

Figure 2:
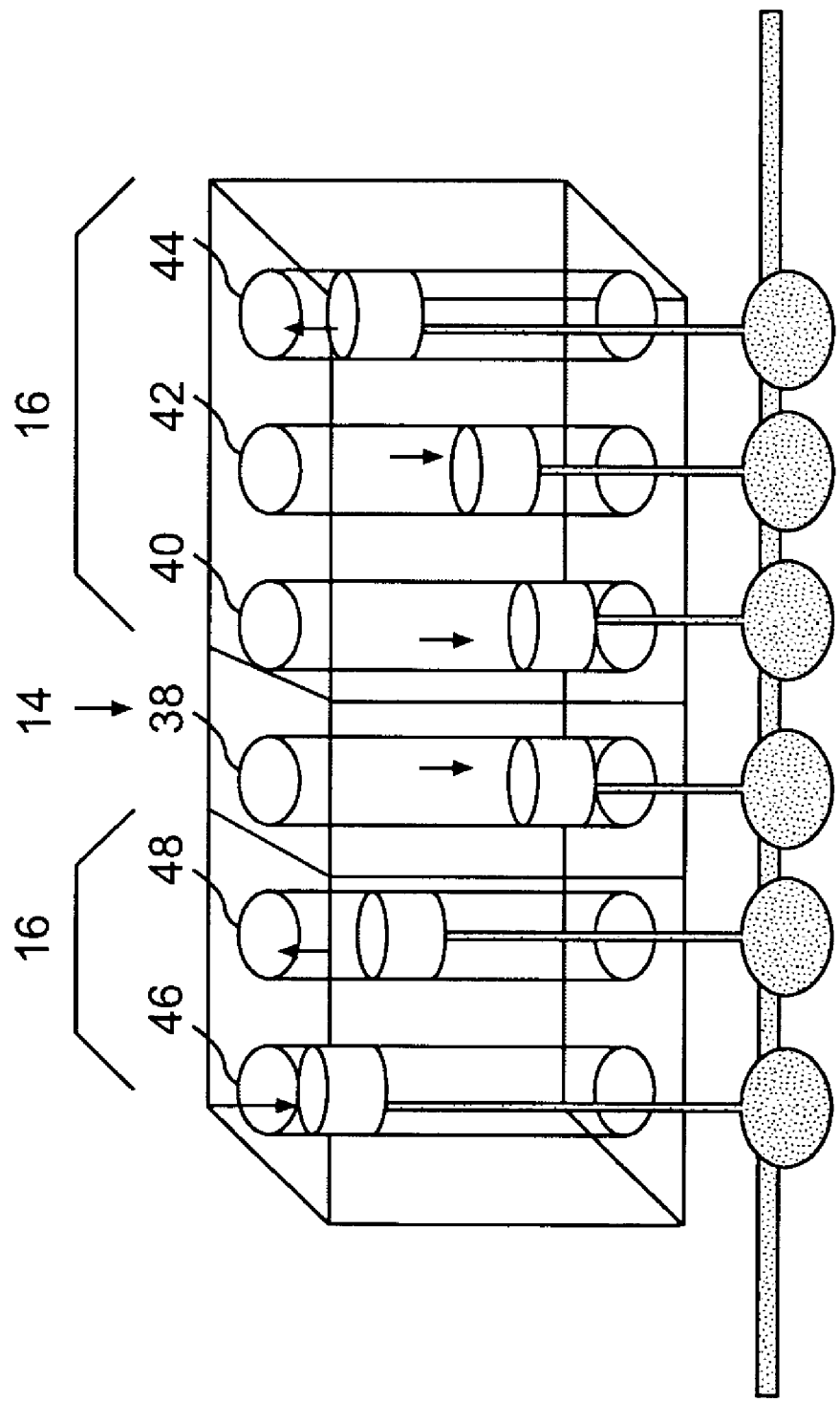
FIG. 2 provides a diagrammatic representation of first and second cylinder groups according to an exemplary disclosed embodiment.

In one embodiment shown in FIG. 2, the stroke cycle of one or more cylinders of first cylinder group 14 may be matched with the stroke cycle of one or more cylinders of second cylinder group 16. In this embodiment, first cylinder group 14 includes only a single cylinder 38, and second cylinder group 16 includes five cylinders, including a cylinder 40 and all other cylinders 42, 44, 46, 48 of second cylinder group 16. Further, single cylinder 38 of first cylinder group 14 has a stroke cycle that is matched with the stroke cycle of cylinder 40 of second cylinder group 16. All the other cylinders 42, 44, 46, 48 of the second cylinder group 16 may have unique stroke cycles.

Figure 3:
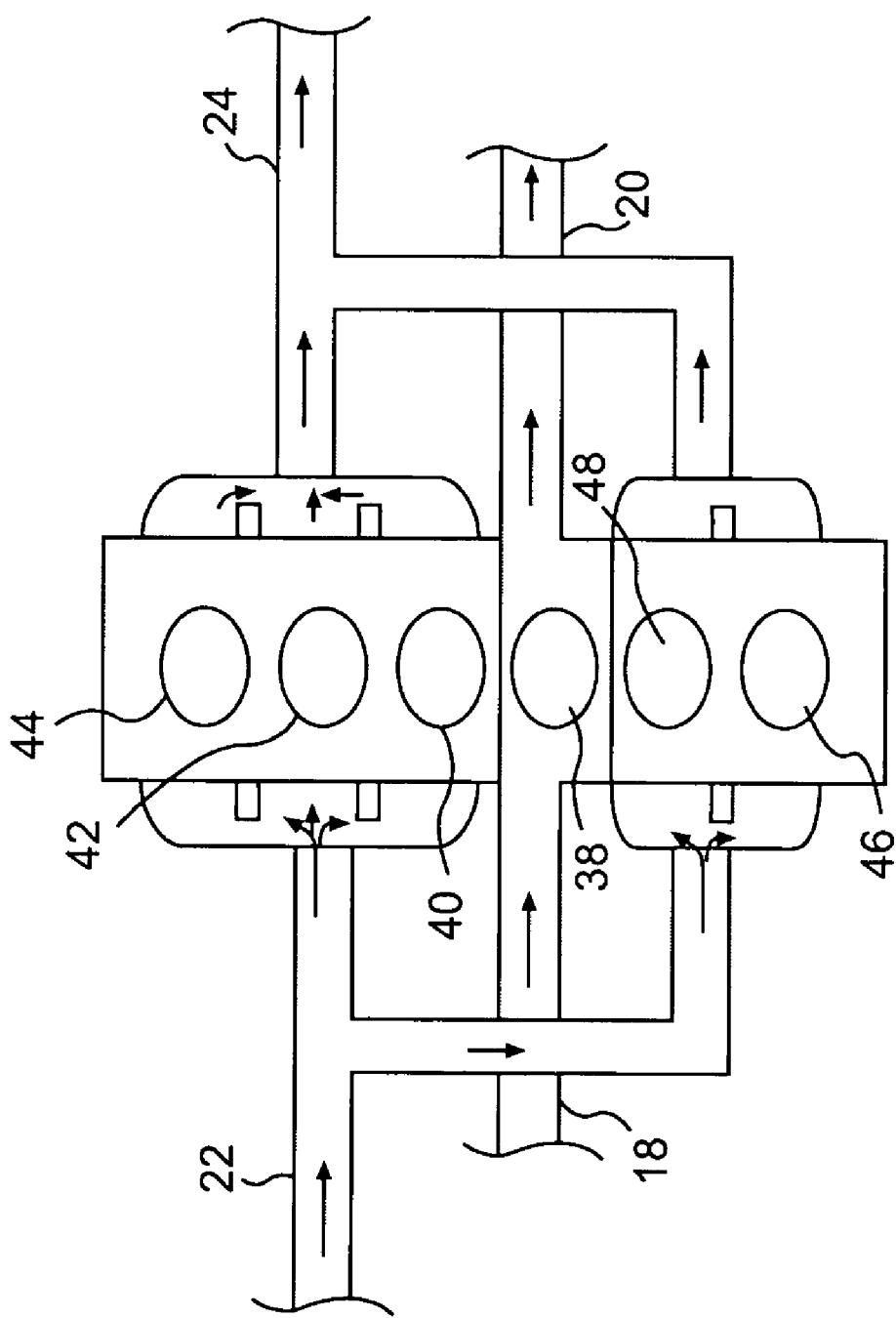
FIG. 3 provides a schematic diagram of first and second cylinder groups according to an exemplary disclosed embodiment.

FIG. 3 illustrates the fluid communications of air-intake passages and exhaust passages with the cylinders of FIG. 2. In this embodiment, first air-intake passage 18 and first exhaust passage 20 may fluidly communicate with a single cylinder 38 of first cylinder group 14. Further, second air-intake passage 22 may fluidly communicate with cylinder 40 of second cylinder group 16, as well as all the other cylinders 42, 44, 46, 48 of second cylinder group 16, and second air-intake passage 22 may be fluidly isolated from first air-intake passage 18. In addition, second exhaust passage 24 may fluidly communicate with cylinder 40 of second cylinder group 16, as well as all the other cylinders 42, 44, 46, 48 of second cylinder group 16.

In one embodiment, the power outputs of each cylinder of power source 12 may be controlled during operation of power source 12. FIG. 4 illustrates exemplary power outputs of each of the cylinders of power source 12. In this embodiment, the power output of each of the cylinders of power source 12 may be expressed as a relative power output. The relative power output is a numeric value multiplied by a variable, in this case (x), wherein the total power output of power source 12 equals the number of cylinders multiplied by the variable, x. Therefore, in the embodiment of FIG. 4, where power source 12 includes six cylinders, the total power output of power source 12 may be expressed as 6x.

The variable, x, may be any power value. For example, x may be a number of horsepower (hp), watts, or foot-pounds per unit time. If, for example, the total power output of all the cylinders 38, 40, 42, 44, 46, 48 of power source 12 equals 30 hp, then x will equal 5 hp.

In one embodiment, illustrated at Time 1 in FIG. 4, the relative power output of each of the cylinders of power source 12, including single cylinder 38, cylinder 40, and all the other cylinders 42, 44, 46, 48 of second cylinder group 16, is approximately 1.0x. The total power output of all the cylinders 38, 40, 42, 44, 46, 48 of power source 12, therefore, equals 6x. In this embodiment, the power output of power source 12 is distributed equally between each of the cylinders of power source 12.

In one embodiment, illustrated at Time 2 in FIG. 4, the relative power output of single cylinder 38 of first cylinder group 14 equals 0.25x, and the relative power output of cylinder 40 of second cylinder group 16 equals 0.75x. Further, the relative power output of all of the other cylinders 42, 44, 46, 48 is approximately 1.25x, and the total power output of all the cylinders 38, 40, 42, 44, 46, 48 of power source 12 equals 6x.

In another embodiment, illustrated at Time 3 in FIG. 4, the relative power output of single cylinder 38 of first cylinder group 14 equals 0.25x, and the relative power output of cylinder 40 of second cylinder group 16 equals 0.95x. Further, the relative power output of all of the other cylinders 42, 44, 46, 48 is approximately 1.2x, and the total power output of all the cylinders 38, 40, 42, 44, 46, 48 of power source 12 equals 6x.

The embodiments at Time 2 and Time 3 of FIG. 4 may allow power source 12 to operate with the minimum possible vibration, while also allowing the relative power outputs of the cylinders of power source 12 to be changed during operation. In these embodiments, matching of the stroke cycles of single cylinder 38 and cylinder 40 may allow these two cylinders to produce combined power and force similar to any one of the other cylinders 42, 44, 46, 48 of second cylinder group 16. Further, the force produced by single cylinder 38 and cylinder 40 may be balanced by the power and force of all the other cylinders 42, 44, 46, 48 of second cylinder group 16.

Controlling the power outputs of each of the cylinders of power source 12 may affect ammonia production, NOx emissions, maximum power output, and/or fuel efficiency. For example, when increased power output is needed, all cylinders of power source 12 may operate at maximum power. In another embodiment, the power output of any one of the one or more cylinders of first cylinder group 14 may be less than the power output of each of the cylinders of second cylinder group 16, as shown at Time 2 and Time 3 of FIG. 4. In this embodiment, first cylinder group 14 may produce less power, but the operation of first cylinder group 14 may be controlled to match ammonia production with NOx production from second cylinder group 16.

INDUSTRIAL APPLICABILITY

The present disclosure provides an exhaust-gas purification system including a power source with on-board ammonia production. This purification system may be useful in all engine types that produce NOx emissions.

The power source of the present disclosure provides a method for improved control of ammonia production, power output, and NOx emissions. The power source includes first and second cylinder groups with fluidly isolated air-intake passages. The fluidly isolated air-intake passages may be connected to separate forced-induction systems to rapidly change air-intake in either one or both of the cylinder groups. Further, in order to increase ammonia production, one cylinder group may operate under lean conditions, and fuel may be injected into the NOx-containing exhaust gas to produce a rich, NOx-containing exhaust that may be converted to ammonia for use with SCR systems.

In addition, the present disclosure provides a method for reducing engine vibrations due to differences in power output of individual engine cylinders. The method includes matching the cylinder stroke cycles of two or more cylinders so that these cylinders may function as a single cylinder. Matching of stroke cycles in this way may reduce engine vibrations by balancing power output and vibrations of each engine cylinder. This method may also allow low engine vibration, while operating the engine at different load levels.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A power source for use with selective catalytic reduction systems for exhaust-gas purification, comprising:
a first cylinder group with a first air-intake passage and a first exhaust passage;
a second cylinder group with a second air-intake passage and a second exhaust passage,
wherein a length of the second air-intake passage which begins at atmosphere is fluidly isolated from a length of the first air-intake passage which begins at atmosphere and extends to a cylinder in the first cylinder group;
a catalyst to convert at least a portion of the exhaust stream in the first exhaust passage into ammonia;
a first system configured to control air flow into the first air-intake passage; and
a second system configured to control air flow into the second air-intake passage, the second system configured to operate independently of the first system.

2. The power source of claim 1, wherein at least one of the first and second air-intake passages includes a forced-induction system.

3. The power source of claim 2, wherein the forced-induction system includes a turbocharger or supercharger.

4. The power source of claim 1, wherein the second exhaust passage includes an oxidation catalyst.

5. A machine including the power source of claim 1.

6. The power source of claim 1, further including a fuel-supply device configured to supply fuel into the first exhaust passage.

7. The power source of claim 6, wherein an exhaust stream in the first exhaust passage is lean upstream from the fuel-supply device.

8. The power source of claim 7, wherein the exhaust stream in the first exhaust passage is rich downstream from the fuel-supply device.

9. The power source of claim 6, wherein the first exhaust passage and the second exhaust passage are fluidly connected downstream from the fuel-supply device to form a merged exhaust passage.

10. The power source of claim 9, further including a catalyst disposed in the merged exhaust passage and configured to facilitate a reaction between ammonia and NOx to at least partially remove NOx from the merged exhaust passage.

11. The power source of claim 1, wherein the length of the second air-intake passage extends to a cylinder in the second cylinder group.

12. The power source of claim 1, further including a first forced-induction system configured to force air through the first air-intake passage, and a second forced-induction system configured to force air through the second air-intake passage.

13. The power source of claim 1, wherein an entire length of the second air-intake passage is fluidly isolated from an entire length of the first air-intake passage.

14. A power source for use with selective catalytic reduction systems for exhaust-gas purification, comprising:
a first cylinder group including:
one or more cylinders;
a first air-intake passage fluidly communicating with the one or more cylinders of the first cylinder group; and
a first exhaust passage fluidly communicating with the one or more cylinders of the first cylinder group;
a second cylinder group including:
at least two cylinders, wherein a single cylinder of the second cylinder group and a single cylinder of the first cylinder group have a matched stroke-cycle, and all other cylinders from the second cylinder group have unique stroke cycles,
a second air-intake passage fluidly communicating with the at least two cylinders of the second cylinder group, wherein the second air-intake passage, which begins at atmosphere and extends to the cylinders of the second cylinder group, is fluidly isolated from the first air-intake passage, which begins at atmosphere and extends to the one or more cylinders of the first cylinder group; and a second exhaust passage fluidly communicating with the at least two cylinders of the second cylinder group;

a catalyst to convert at least a portion of the exhaust in the first exhaust passage into ammonia;

a first system configured to control air flow into the first air-intake passage; and a second system configured to control air flow into the second air-intake passage, the second system configured to operate independently of the first system.

15. The power source of claim 14, wherein the at least a portion of the exhaust in the first exhaust passage includes NOx.

16. The power source of claim 14, wherein the first cylinder group includes only one cylinder and the second cylinder group includes five cylinders.

17. The power source of claim 14, wherein a power output from the single cylinder of the first cylinder group, having the matched stroke cycle with a cylinder from the second cylinder group, is less than a power output from each of the remaining cylinders of the second cylinder group.

18. The power source of claim 14, wherein a combined power output from the matched cylinders of the first and second cylinder groups is approximately equal to a power output of each of the remaining cylinders from the second cylinder group.

19. The power source of claim 14, wherein at least one of the first and second air-intake passages includes a forced-induction system.

20. The power source of claim 14, wherein the second exhaust passage includes an oxidation catalyst.

21. A machine including the power source of claim 14.

22. he power source of claim 14, further including a fuel-supply device configured to supply fuel into the first exhaust passage.

23. The power source of claim 22, wherein an exhaust stream in the first exhaust passage is lean upstream from the fuel-supply device.

24. The power source of claim 23, wherein the exhaust stream in the first exhaust passage is rich downstream from the fuel-supply device.

25. The power source of claim 22, wherein the first exhaust passage and the second exhaust passage are fluidly connected downstream of the fuel-supply device to form a merged exhaust passage.

26. The power source of claim 25, further including a catalyst disposed in the merged exhaust passage and configured to facilitate a reaction between ammonia and NOx to at least partially remove NOx from the merged exhaust passage.

27. A method of operating a power source for use with selective catalytic reduction systems for exhaust-gas purification, comprising:

supplying air through a first air-intake passage, which begins at atmosphere, to a first cylinder group including one or more cylinders;

supplying a first exhaust stream to a first exhaust passage in fluid communication with the one or more cylinders of the first cylinder group;

supplying air through a second air-intake passage, which begins at atmosphere, to a second cylinder group including at least two cylinders,
wherein the first air-intake passage is fluidly isolated along its entire length from the second air-intake passage, the first cylinder group and second cylinder group are operably connected to a single drive shaft, and the air is supplied through the second air-intake passage independently of the air supplied through the first air-intake passage;

supplying a second exhaust stream to a second exhaust passage in fluid communication with the at least two cylinders of the second cylinder group; and converting at least a portion of the first exhaust stream to ammonia.

28. The method of claim 27, wherein the at least a portion of the first exhaust stream includes NOx.

29. The method of claim 27, further including matching a stroke cycle of a single cylinder from the first cylinder group with a stroke cycle of a single cylinder from the second cylinder group and maintaining unique stroke cycles for all other cylinders from the second cylinder group.

30. The method of claim 27, further including supplying air to at least one of the first and second air-intake passages through a forced-induction system.

31. The method of claim 27, further including merging the exhaust stream of the first exhaust passage with the exhaust stream of the second exhaust passage to form a merged exhaust stream.

32. The method of claim 31, further including using an oxidation catalyst to control a ratio of NO to $NO_2$ in the merged exhaust stream.

33. The method of claim 31, further including:
exposing the merged exhaust stream to a catalyst configured to facilitate a reaction between ammonia and NOx; and
at least partially removing NOx from the merged exhaust stream.

34. The method of claim 27, further including supplying fuel to the first exhaust stream from a fuel-supply device operably connected to the first exhaust passage.

35. The method of claim 34, further including operating the one or more cylinders of the first group such that the first exhaust stream is lean upstream of the fuel-supply device.

36. The method of claim 35, further including using the fuel-supply device to make the first exhaust stream rich downstream of the fuel-supply device.

* * * * *